Oct. 28, 1952     G. B. WILKEN     2,615,278
SELF-SETTING RODENT TRAP
Filed Nov. 15, 1951

GEORGE B. WILKEN,
INVENTOR.

BY
ATTORNEY.

Patented Oct. 28, 1952

2,615,278

UNITED STATES PATENT OFFICE 2,615,278

SELF-SETTING RODENT TRAP

George B. Wilken, Escondido, Calif.

Application November 15, 1951, Serial No. 256,458

9 Claims. (Cl. 43—95)

This invention relates to an improved rodent trap embodying an arrangement for automatically and easily setting the trap without danger to the fingers or hands of the person setting the trap and wherein a trip plate is not employed for holding the trap in set position. This application is a continuation-in-part of Patent No. 2,575,435, issued November 20, 1951.

Prior proposed rodent traps for moles, gophers, etc., include strong springs which actuate by various means opposed members or arms having pointed ends adapted to pierce and impale a rodent. It is difficult and awkward to set such a trap because of the necessity of guidably moving (while working against a strong spring resistance) a latching lever or trigger arm into positive engagement with a trip plate. Both hands and several fingers are usually required to accomplish the trap setting operation. Since the trap is relatively small and hard to hold while working against the spring resistance, one hand usually works in close proximity to the piercing arms of the trap. Slipping of either hand may cause a partially set trap to suddenly close with resultant serious injury to one or both of the hands.

Prior proposed traps utilized positive direct engagement between a trigger arm and a trip plate to hold the trap in open or trap set position. When a rodent touched or bumped the trip plate, the engagement between the trigger arm and trip plate was broken and such disengagement resulted in springing the trap to closed position. In addition, the trigger arm and the trip plate were often biased by springs to hold them in selected position whereby engagement of the trigger arm and trip plate was facilitated. The rodent trap of this invention differs from such prior proposed rodent traps in that positive engagement between the trigger arm and the trip plate is eliminated and springs are not required for holding a trigger plate or a trigger arm in a desired position.

Generally speaking, a rodent trap embodying this invention includes a base and an overlying actuating member usually formed from one piece of wire as in the Macabee type of trap. The actuating member carries a cross arm adjacent to one end and the base pivotally supports a latching means below the cross arm. The latching means includes a selectively configured upwardly extending latching portion which automatically and positively cooperates with the cross arm on the actuating member for holding the trap in open or trap set position. A release portion in the form of a longitudinally extending arm is associated with said latching portion and extends forwardly for actuation by a rearwardly extending portion of a trip means of bell crank form so that when a rodent bumps the trip means the latching portion is released from engagement with the cross arm.

A primary object of this invention is to design and provide a simple and efficient arrangement for automatically setting a rodent trap by the operation of only a single hand and without placement of the hand near the piercing arms.

Another object of this invention is to design and provide for a rodent trap a latching or trigger lever means which is cooperatively associated with a spring-biased trap actuating member to hold a trap actuating member in trap set position.

Another object of this invention is to design and provide an improved self-setting gopher trap wherein a latching portion pivotally carried by a base is automatically movable into positive holding engagement with a cross arm on an actuating member when the actuating member is moved downwardly for holding the trap in open position.

Still another object of this invention is to design and provide a self-setting gopher trap wherein the latching means is releasable by trip means having lever means associated therewith to engage said latching means.

Still another object of this invention is to design and provide an improved self-setting gopher trap wherein latching means includes a release portion normally not cooperatively engaged with a trip means when in trap set position and movable by the trip means to release an associated latching portion from engagement with a trap actuating member for closing the trap.

Other objects and advantages of this invention will be readily apparent from the following description of the drawings.

Figure 1:
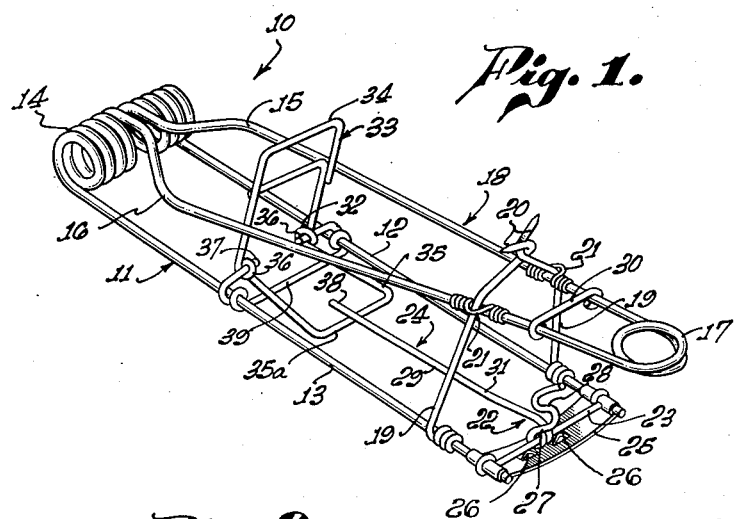
Fig. 1 is a perspective view of a rodent trap embodying this invention.
Figure 2:
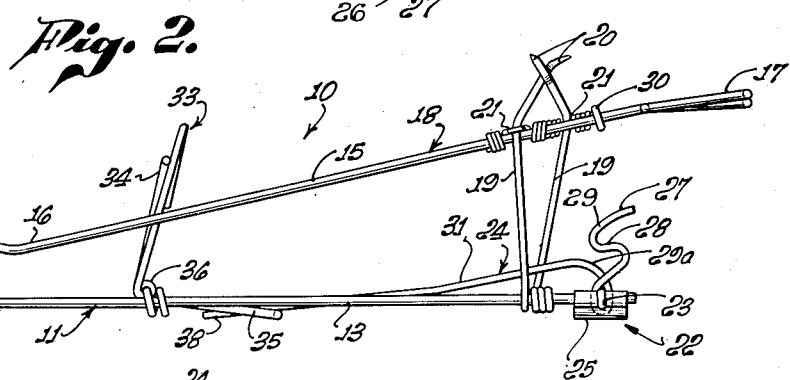
Fig. 2 is a side view of the trap shown in Fig. 1, the trap being shown in open or trap set position.

Referring particularly to Fig. 1, the rodent trap generally indicated at 10 includes a trap of well-known form and manufacture generally identified as a Macabee type of gopher trap. The rodent trap 10 includes a base frame 11 comprising a generally U-shaped wire frame having spaced parallel legs 12 and 13. At one end of the frame 11, the ends of legs 12 and 13 may be suitably wound inwardly to provide transversely extending and axially aligned helical springs 14. The springs 14 terminate centrally of the base in wire elements 15 and 16 which overlie the base frame 10 and which are normally angularly disposed with respect to said base. The base, spring, and elements 15 and 16 may be of one piece of suitable wire.

The elements 15 and 16 flare outwardly adjacent springs 14, are bent slightly inwardly intermediate the ends of the trap, and terminate generally slightly beyond the end of base frame 11. Elements 15 and 16 are integrally joined to provide a thumb piece or rest 17 extending beyond the base, said thumb rest being formed by turning the wire about a vertical axis and having sufficient diameter for providing an adequate supporting surface for a thumb placed thereon when setting the trap. Elements 15 and 16 and thumb piece or rest 17 thereby form a trap setting and actuating member generally indicated at 18.

Upwardly directed and inwardly bent opposed piercing arms 19 may be pivotally mounted on legs 12 and 13, said arms having their upper ends 20 sharply bent outwardly so as to provide opposed piercing points when the arms are in their trap setting position. The arms 19 are guided to and from their open and closed positions by means of U-shaped guides 21 suitably secured on elements 15 and 16 above the pivotal mountings of arms 19. As the overlying actuating member 18 is urged downwardly by a thumb placed upon thumb rest 17, piercing arms 19 will be spread apart into open position by the guides 21. When the trap is sprung, elements 15 and 16 are moved upwardly by the action of springs 14, the guides causing the arms 19 to move to closed position.

This invention lies in an automatic self-setting arrangement for moving and holding piercing arms into open trap set position and in a novel release arrangement for closing the trap. The latching means generally indicated at 22 may comprise a transverse member 23 extending between legs 12 and 13 of the base at the end opposite to springs 14. Pivotally mounted upon the transverse member 23 intermediate its ends is a latching and release lever means generally indicated at 24. Means for positioning lever means 24 intermediate legs 12 and 13 may be provided by a flat metal strip 25 extending between legs 12 and 13 and provided with spaced upwardly stamped or punched-out lugs 26, said lugs 26 acting as stop means to limit movement of the lever 24 along the transverse member 23. It will be understood that transverse member 23 may be provided with a suitably configured center portion so as to maintain the latching lever means 24 centrally between legs 12 and 13.

The latching lever 24 includes an upwardly directed latching portion 27 of sigmoidal or generally S configuration as viewed in Fig. 1. The latching portion 27 includes a virtually horizontal intermediate section 28 disposed above and extending across member 23, and an upwardly inclined, rearwardly directed section 29 merging with the forward end of the horizontal section 28 along a suitable radius. The latching portion 27 also includes a coiled section for pivoting the lever 24 on member 23, said coiled section terminating in a forwardly and upwardly curved segment 29a spaced below and adjacent to the horizontal section.

Figure 3:
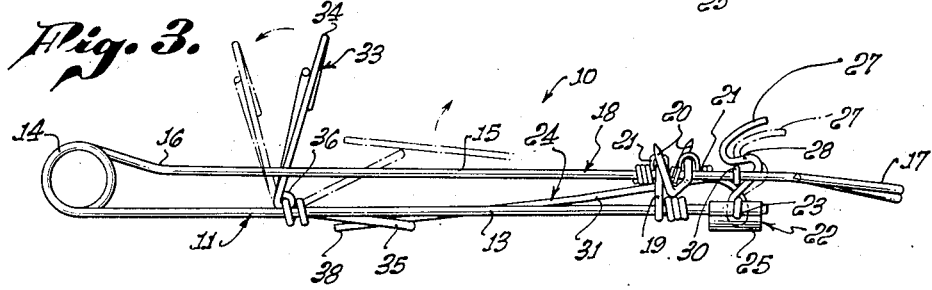
Fig. 3 is a side view showing the trap in closed position, and with phantom lines indicating the trip means and latching means in release position.

Above the latching portion 27 a cross arm 30 extends between the elements 15 and 16 of the actuating member 18, said cross arm 30 being positioned between the thumb rest 17 and the piercing arms 19 and approximately above and slightly forwardly of the transverse member 23 when the actuating member is in trap set position as in Fig. 3.

Figure 4:
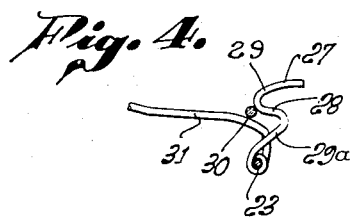
Fig. 4 is a fragmentary view of the cooperable latching portion and cross arm just prior to final setting position of the trap.

Upon downward movement of the actuating member 18 by application of pressure against thumb rest, the cross arm 30 contacts the forward edge of the inclined rearwardly directed section 29 whereby the latching portion is pivoted in a clockwise direction, as viewed in Fig. 1, so that the cross arm 30 may pass in front of the horizontal section 28. When the cross arm is disposed below section 28, the latching portion 27 is urged in counterclockwise direction by positive contact with the upper edge of segment 29a (Fig. 4). As the member 18 is further depressed, the contact of cross arm 30 with segment 29a causes horizontal section 28 to move partially across cross arm 30 into overlying relationship therewith. When pressure is released from thumb rest 17, cross arm 30 moves slightly upward into the positive holding engagement with section 28. Counterclockwise rotation of the latching portion is limited by the trip means as described hereafter.

The release means for the trap includes a forwardly and longitudinally extending release arm 31 which forms the release portion of the latching means. The release arm 31 is preferably formed integral with latching portion 27 and is adjustably angularly related to the latching portion 27. The release arm 31 may be slightly convexly curved, as viewed from the top, to smoothly and integrally merge with latching segment 29a. The arm 31 at its free end normally lies in the planar zone of the base 11.

Between springs 14 and piercing arms 19 may be pivotally mounted, as at 23, a trip means 33. The trip means 33 may include a wire frame having an upstanding generally inverted U-shaped portion 34 adapted to be contacted by a rodent for releasing the trap as described hereafter. The trip portion 34 may be integral with a rearwardly extending U-shaped release portion 35, said portion 35 lying normally in the plane of base 11 and approximately at right angles to the plane of the upstanding trip portion 34 to form substantially a bell crank arrangement. The release portion 35 is joined with the trip portion 34 by one or more turns 36 of the wire to provide journals into which transversely inwardly projecting pins 37 extend for forming the pivotal mountings at 32. The pins 37 may be suitably connected to the base members 12 and 13 by turning end portions of a cross bar 39 about said elements as shown. The cross bar 39 limits downward rotation of the release portion 35 for maintaining portion 35 approximately in the plane of the base 11.

The wire frame of the trip means may be made of one piece of wire and, when formed in the bell crank arrangement shown, may be easily pivotally mounted, by pressing inwardly at journals 36 and then releasing the pressure when pins 37 are aligned with the journals, the resiliency of the wire holding the frame on the journals.

A free end 38 of the release arm 31 normally overlies release portion 35 and rests upon the transverse element 35a thereof. Since the downward rotation of release portion 35 is limited by cross bar 39, counterclockwise rotation of the latching portion, when the trap is being set is likewise limited by contact of end 38 of arm 31 with the element 35a of the release portion 35.

When a gopher bumps trip portion 34, the release portion 35 is raised by pivotal movement of the trip frame about pins 37 and lifts the free end 38 of release arm 31 upwardly to positively rotate in a clockwise direction (Fig. 1) the latching portion 27. Upon such rotation, the horizontal section 28 is disengaged with the cross arm 30 to release the actuating member 18 and to spring the trap into closed position. Rearward rotation of the trip means may be limited by the narrowing of the spacing between elements 15 and 16 so that the overlying relationship of end 38 of arm 31 with element 35a will be maintained.

The sensitiveness of the trap to a force applied against the trip means may be adjusted by slightly varying the relationship of the horizontal section 28 with the cross arm 30 as by either upwardly or downwardly inclining section 28. This may be readily accomplished by changing the angular relationship of the latching portion 27 with the release arm 31. It will be readily apparent that bending of free end 38 of arm 31 will modify the position which section 28 assumes when end 38 rests upon the release portion 35. Thus the number of degrees of rotation of the latching portion 27 about member 23 between release position and latched position may be easily varied. The self-setting trap of this invention may be easily set by one hand. Since a positive latching arrangement is provided between latching portion 27 and cross arm 30, the trap may be set while holding in substantially any position. When in normal horizontal position gravity may aid in the counterclockwise rotation of the latching lever because of the longitudinally extending release arm 31. Likewise initial impetus to the counterclockwise rotation may be secured by contact of piercing arms 19 with release arm 31. It should be noted however that the latching operation of the present invention does not depend upon gravity or contact of the arm 30 with the piercing arms.

The positive and automatic setting of such a rodent trap by the use of only one hand is very advantageous and reduces to a minimum the hazards and dangers involved in setting such trap because the fingers hold the trap on the side opposite that side on which the piercing arms are operable. The thumb rest is also spaced from the piercing arms and is of sufficient area so that slipping of a thumb between the piercing arms is extremely unlikely. It is obvious that there is no necessity for using a second hand while setting the trap either to study the trap or to guide the latching means into trap set position.

It will also be noted that the latching means is positively guided into holding position without the use of springs and that the trap is set without the use of positive holding engagement with a trip plate. In other words, the setting operation of this improved rodent trap does not require cooperation of a trip plate. The trap may be quickly and easily set by merely moving the actuating arm downwardly so that horizontal section 28 of the latching portion may overlie and engage cross arm 30 to securely hold the actuating member in trap set position.

Release of this improved rodent trap does not require positive disengagement of a release arm with a trip plate. It is so arranged that the trip means merely lifts the release arm so as to rotate through a few degrees the latching portion 27.

The positive latching engagement of the horizontal section 28 with the cross arm 30 is so designed and arranged that accidental release of the actuating member is substantially eliminated. A predetermined selected measurable safety factor against accidental release may be provided by slightly changing the disposition of the horizontal section and by changing the angular relation between the release arm and latching portion so that a preselected amount of rotation of the trip means must occur before the actuating member is released.

All changes and modifications made in the trap described above and coming within the scope of the appended claims are embraced thereby.

I claim:

1. In a self-setting rodent trap including a longitudinally extending base and an overlying trap actuating member having one end spring mounted to said base and piercing arms pivotally connected to the base and guidably connected to the actuating member for movement of said arms in a plane transverse to the actuating member, the provision of: a thumb rest provided at the free end of the actuating member; a cross arm carried by the actuating member between the thumb rest and the piercing arms; trip means pivotally mounted on the base between the spring end and the piercing arms, said trip means including a rearwardly extending portion lying normally in the planar zone of said base; a latching means pivotally mounted on the base below said cross arm for movement in a longitudinal vertical plane, said latching means including an upwardly extending sigmoidal latching portion including a forwardly directed virtually horizontal section and an upwardly and rearwardly directed section merging with the forward end of said horizontal section, whereby the cross arm contacts the rearwardly directed section for rearwardly turning the latching portion so as to engage the cross arm beneath said horizontal section of the latching portion; a release portion connected to said latching portion and extending forwardly with its free end overlying the rearwardly extending portion of said release means, said release portion normally urging the horizontal section of the latching portion into holding position by gravity, said rearwardly extending portion of the trip means being capable of lifting said release portion for turning said latching portion whereby the horizontal section of the latching means is disengaged from said cross arm for closing the trap.

2. In a self-setting rodent trap including a longitudinally extending base and an overlying trap actuating member having one end spring mounted to said base and piercing arms pivotally connected to the base and guidably connected to the actuating member for movement of said arms in a plane transverse to the actuating member, the provision of: a cross arm carried by the actuating member in spaced relation to the piercing arms; trip means pivotally mounted on the base between the spring end and the piercing arms, said trip means including a rearwardly extending portion lying normally in the planar zone of said base; a latching means pivotally mounted on the base below said cross arm for movement in a longitudinal vertical plane, said latching means including an upwardly extending latching portion including a forwardly directed virtually horizontal section and an upwardly and rearwardly directed section merging with the forward end of said horizontal section, whereby the cross arm may contact the rearwardly directed section for rearwardly turning the latching portion so as to cooperably engage the cross arm beneath said horizontal section of the latching portion; a release arm connected to said latching portion and extending forwardly with its free end overlying the rearwardly extending portion of said release means, said release arm normally urging the horizontal section of the latching portion into holding position by gravity, said rearwardly extending portion of the trip means being capable of lifting said release arm for moving said latching portion whereby the horizontal section of the latching means is disengaged from said cross arm for closing the trap.

3. In a self-setting rodent trap including a longitudinally extending base and an overlying trap actuating member having one end spring mounted to said base and piercing arms pivotally connected to the base and guidably connected to the actuating member for movement of said arms in a plane transverse to the actuating member, the provision of: a cross arm carried by the actuating member in spaced relation to the piercing arms; trip means pivotally mounted on the base between the spring end and the piercing arms, said trip means including a rearwardly extending portion lying normally in the planar zone of said base; a latching means pivotally mounted on the base below said cross arm for movement in a longitudinal vertical plane, said latching means including an upwardly extending latching portion including a forwardly directed virtually horizontal section and an upwardly and rearwardly directed section merging with the forward end of said horizontal section, whereby the cross arm contacts the rearwardly directed section for rearwardly rotating the latching portion to cooperably engage the horizontal section and the cross arm; a release arm connected to said latching portion and extending forwardly with its free end overlying the rearwardly extending portion of said release means, said release arm being movable to urge the horizontal section of the latching portion into holding position, said rearwardly extending portion of the trip means being capable of lifting said release arm for rotating said latching portion whereby the horizontal section of the latching means is disengaged from said cross arm for closing the trap.

4. A rodent trap as claimed in claim 3 wherein the release arm is upwardly arched and is adapted to be contacted by the piercing arms when the actuating member is depressed to cause counter-rotation of the latching means for moving the horizontal section into overlying holding relation to the cross arm.

5. In a self-setting rodent trap including a base, an overlying longitudinal trap setting and trap actuating member having one end spring mounted to said base and piercing arms pivotally connected to the base and slidably connected to the actuating member for movement of said arms in a plane transverse to the actuating member, the provision of: a cross arm carried by the actuating member adjacent to the piercing arms; latching lever means pivotally mounted on the base below said cross arm for movement in a longitudinal vertical plane, said latching lever means including an upwardly extending sigmoidal latching portion and a longitudinally extending release portion, said latching portion having a section cooperable with the cross arm for rearwardly rotating said latching portion and a holding section adapted to cooperably engage said cross arm upon sequential forward rotation of said latching portion; trip means pivotally mounted on said base and including a rearwardly extending means normally underlying the end of said release portion whereby forward rotation of said trip means will lift said release portion to disengage said cross arm from said holding section by rearward rotation of said latching portion.

6. A trap as claimed in claim 5 wherein means are provided for positioning said lever means between the sides of the base.

7. In a self-setting rodent trap including a base and an overlying trap setting and trap actuating member spring mounted thereon at one end, the combination of: a latching and releasing lever means pivotally mounted on said base adjacent one end thereof, said lever means including an upwardly directed latching portion and a longitudinally extending release arm in angular relation to said latching portion, a cross arm on said actuating member cooperable with said latching portion to automatically move said latching portion into holding relationship therewith upon depressing the actuating member; trip means pivotally mounted on said base in spaced relation to said latching means, said trip means including an upstanding trip portion and a rearwardly extending trip release portion angularly disposed with relation to said trip portion; said latching lever release arm having an end overlying said trip release portion whereby said release arm may be lifted for releasing said latching portion.

8. A rodent trap as claimed in claim 7 wherein the latching portion is provided with a virtually S configuration.

9. In a self-setting rodent trap including a base, an overlying trap actuating means spring mounted at one end of said base, piercing arms carried by said base and movable into trap set and trap open position by said actuating means, the combination of: a lever means pivotally mounted on said base and including a sigmoidal latching portion normally disposed in one position; means on said actuating means cooperable with said latching portion upon depressing the actuating means to cause said latching portion to move to one side of said cooperable means; said lever means including a member angularly related to and connected to said latching portion to return said latching portion to normal position and into holding engagement with said cooperable means; a trip means pivotally mounted on said base in spaced relation to said lever means, said trip means having angularly related portions one of which normally underlies said member and is adapted to raise said member for moving the latching portion out of holding engagement with said cooperable means.

GEORGE B. WILKEN.

No references cited.